Aug. 4, 1953 E. A. WILSHER ET AL 2,647,334
WRAPPER FOR ARTICLES OF MERCHANDISE
Filed March 12, 1949
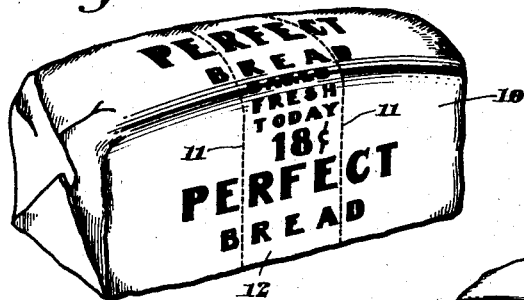
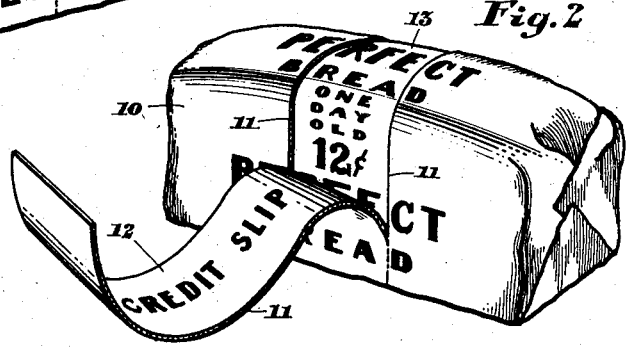
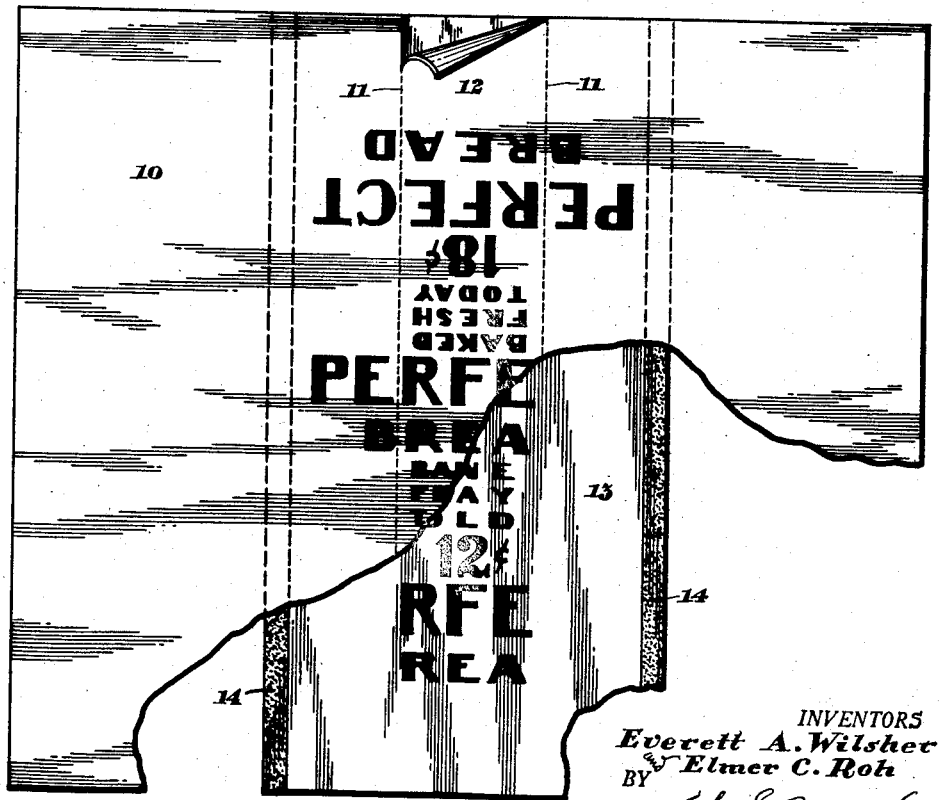
INVENTORS
Everett A. Wilsher
Elmer C. Roh
BY
John S. Braddock
Attorney Patented Aug. 4, 1953

2,647,334

UNITED STATES PATENT OFFICE 2,647,334

WRAPPER FOR ARTICLES OF MERCHANDISE

Everett A. Wilsher and Elmer C. Roh,
Grand Rapids, Mich.

Application March 12, 1949, Serial No. 81,056

1 Claim. (Cl. 40—2)

The present invention relates to wrappers for articles of merchandise, and more particularly to bread wrappers.

At the present time it is common practice with bakeries, at the time of supplying dealers with freshly baked bread, to gather up the loaves of bread which were previously supplied but which remained unsold. The stale loaves are customarily returned to the bakery for sale to farmers or other users for a very small fraction of the price of new loaves. However, there are many persons who do not object to purchasing bread which is a day old provided that it is properly identified as such, and other persons who would purchase day-old bread at a reduced price in preference to more expensive fresh bread. It is therefore an object of this invention to provide a single wrapper which will identify the bread when fresh and which may also conveniently be made to identify the bread when it is a day old.

Other objects of the invention are to provide a novel wrapper for any article of merchandise, which wrapper comprises an outer wrapping sheet bearing a display or legend, and a second sheet underlying and secured to the first sheet and bearing a different display or legend which may be exposed to view upon the removal of a perforated portion of the first sheet, and in such manner that the article of merchandise remains securely wrapped; and more specifically to provide a bread wrapper having an outer sheet bearing a legend conveying the idea and the price of freshly baked bread, and which outer sheet may have a portion thereof detached therefrom when the bread has remained on the dealer's shelf for a day so that an inner sheet is exposed which bears a legend conveying the idea of day-old bread at a reduced price.

These and any other and more specific objects hereinafter appearing are attained by the illustrative embodiment of the invention shown in the accompanying drawing, wherein:

Figure 1 is a perspective view of a freshly baked loaf of bread wrapped in our new bread wrapper;

Figure 2 is a perspective view of the same illustrating the removal of a legend-bearing portion of the outer wrapping sheet to expose an inner sheet identifying the same loaf of bread after it has become one day old; and Figure 3 is a top plan view of the new bread wrapper, per se, with portions thereof broken away to reveal other portions.

Referring now in detail to these drawings, and referring first particularly to Figure 3, the new wrapper comprises an outer wrapping sheet 10 of more or less conventional size and of appropriate material such as waxed paper, and bearing a printed display across its exposed face. As here shown said display consists of the brand identification "Perfect Bread."

The middle portion of the outer wrapping sheet 10 is provided with parallel lines of perforation 11 defining a strip 12 which is manually severable from the main body of the sheet and which bears a printed legend "Baked Fresh Today 18¢."

A second or inner sheet 13, likewise of waxed paper or other suitable material, underlies the middle portion of the outer sheet 10 and extends outwardly at its opposite sides beyond the perforations 11 on the sheet 10. The second sheet 13 is secured to the sheet 10 along its marginal side edges 14 as by means of a suitable adhesive or by means of heat-sealing in instances where one or both of the sheets 10, 13 has the heat-sealing properties of waxed paper.

The second sheet 13 has its middle portion which underlies the perforated strip 12 of the first sheet, inscribed with the printed legend "One Day Old 12¢" and also with those parts of the identification "Perfect Brand" which underlie the same parts of said identification on the outer sheet's strip 12. It will therefore be seen that when the strip 12 is severed from the outer sheet 10 as illustrated in Figure 2 of the drawing, the identification "Perfect Brand" remains intact and the legend "One Day Old 12¢" replaces the legend "Baked Fresh Today 18¢." It will also readily be seen that the underlying second sheet 13, being secured at its opposite sides to the opposite side portions of the outer sheet 10, maintains the wrapper intact and the loaf of bread securely wrapped.

It may be found desirable to utilize the strip 12 as a credit slip, in which instance the underside of said strip may be inscribed "Credit Slip" as illustrated in Figure 2. This strip, when severed from the wrapper, may then be retained and used by the agent for the bakery as evidence that the bread was sold at a reduced price.

It will thus be seen that the invention provides a novel bread wrapper which serves the usual purposes of protecting the loaf of bread encased therein and of identifying the brand of bread, and which in addition serves to indicate to customers whether the bread is freshly baked or a day old. Other uses for the novel wrapper may be conceived, and it will be understood that the invention comprehends all such uses and any modifications of the wrapper shown such as fall within the scope and spirit of the following claim.

We claim:

A bread wrapper comprising a sheet adapted to wholly encase a loaf of bread and having a legend-bearing portion girdling the loaf of bread and conveying the idea and the price of freshly baked bread on the outer surface thereof and being severable from the main body of the sheet, said legend-bearing portion having another legend on the inner surface thereof conveying the idea of a credit slip, and a second sheet girdling the loaf of bread and underlying the first sheet and having a legend-bearing portion underlying that of the first sheet and conveying the idea and the lower price of day-old bread, the legend-bearing portion of said second sheet being exposable to view upon the severance of the legend-bearing portion of the first sheet from the main body thereof, said second sheet being secured to the first sheet in areas lying outside the girdling severable portion of the first sheet whereby the loaf of bread remains securely and wholly encased by the combined first and second sheets after severance of the girdling severable portion of the first sheet from the main body thereof.

EVERETT A. WILSHER.
ELMER C. ROH.

References Cited in the file of this patent

UNITED STATES PATENTS

| Number | Name | Date |
|---|---|---|
| 1,116,043 | Elliott | Nov. 3, 1914 |
| 1,273,105 | Van Dyke | July 16, 1918 |
| 1,849,774 | Taylor | Mar. 15, 1932 |
| 2,109,603 | Worth | Mar. 1, 1938 |
| 2,115,318 | Rosen | Apr. 26, 1938 |
| 2,134,971 | Guyer | Nov. 1, 1938 |
| 2,408,317 | Jones | Sept. 24, 1946 |